(12) United States Patent
Van Biesen

(10) Patent No.: US 11,905,989 B2
(45) Date of Patent: Feb. 20, 2024

(54) CLAMPING FOR A DEVICE COMPRISING BEARINGS

(71) Applicant: NEWSON NV, Dendermonde (BE)

(72) Inventor: Marc Van Biesen, Lebbeke (BE)

(73) Assignee: NEWSON NV, Dendermonde (BE)

(*) Notice: Subject to any disclaimer, the term of this patent is extended or adjusted under 35 U.S.C. 154(b) by 488 days.

(21) Appl. No.: 17/058,532

(22) PCT Filed: May 30, 2018

(86) PCT No.: PCT/EP2018/064263
§ 371 (c)(1),
(2) Date: Nov. 24, 2020

(87) PCT Pub. No.: WO2019/228629
PCT Pub. Date: Dec. 5, 2019

(65) Prior Publication Data
US 2021/0215196 A1 Jul. 15, 2021

(51) Int. Cl.
*G02B 26/08* (2006.01)
*F16C 19/54* (2006.01)
(Continued)

(52) U.S. Cl.
CPC ............ *F16C 19/54* (2013.01); *F16C 25/083* (2013.01); *G02B 7/1821* (2013.01);
(Continued)

(58) Field of Classification Search
CPC .... F16C 19/54; F16C 25/083; F16C 2300/12; F16C 2370/20; G02B 7/1821; G02B 26/105; G02B 27/642
See application file for complete search history.

(56) References Cited

U.S. PATENT DOCUMENTS 4,060,314 A 11/1977 Heinz
5,422,471 A 6/1995 Plesko
(Continued)

FOREIGN PATENT DOCUMENTS

JP S60 164716 A 8/1985
JP S61 130612 A 6/1986
(Continued)

OTHER PUBLICATIONS

ISR-WO for parent application PCT/EP2018/064263 dated Feb. 18, 2019.
(Continued)

*Primary Examiner* — Euncha P Cherry
(74) *Attorney, Agent, or Firm* — Vorys, Sater, Seymour and Pease LLP

(57) ABSTRACT

The current invention relates to an electrically actuated device for orientating an optical element around a rotational axis comprising a rotor and a stator, said rotor comprising said axis, said axis comprising an optical end and an electronic end, the stator comprising a means for generating a magnetic field; the device further comprising a first axial rotation bearing associated with said optical end and a second axial rotation bearing associated with said electronic end, each bearing comprising an inner part and an outer part; said device further comprising electronic actuation means for providing a charged particle having a velocity v moving through a conductor provided on said rotor, wherein the axis is able to perform a rotational movement over less than 180°, and whereby the orientation of said axis is controlled by a Lorentz force resulting from said charged particle moving in said magnetic field; wherein said device comprises axis-related clamping means configured to exert an axial force on the inner parts of the bearings toward each other for axially (Continued)

clamping said axis, thereby radially fixating said axis with respect to each of the inner parts of the bearings.

18 Claims, 5 Drawing Sheets

(51) Int. Cl.
*F16C 25/08* (2006.01)
*G02B 7/182* (2021.01)
*G02B 26/10* (2006.01)

(52) U.S. Cl.
CPC ........ *G02B 26/105* (2013.01); *F16C 2300/12* (2013.01); *F16C 2370/20* (2013.01)

(56) References Cited

U.S. PATENT DOCUMENTS

| | | | |
|---|---|---|---|
| 7,130,094 | B2 | 10/2006 | Van Biesen |
| 2018/0145575 | A1* | 5/2018 | Woehl-Bruhn ...... H02K 1/2766 |

FOREIGN PATENT DOCUMENTS

| | | |
|---|---|---|
| JP | S61 117139 A | 8/1986 |
| JP | H02 56519 A | 2/1990 |
| WO | 2015192914 A1 | 12/2015 |
| WO | 2019228629 A1 | 5/2019 |

OTHER PUBLICATIONS

IPRP for parent application PCT/EP2018/064263 dated Sep. 17, 2020.

* cited by examiner

CLAMPING FOR A DEVICE COMPRISING BEARINGS

TECHNICAL FIELD

The invention pertains to the technical field of rotation of an axis of an electrically actuated device. Particularly, the invention relates to applications where accurate orientating of an axis is required, as e.g. in the orientating of optical elements.

BACKGROUND

Devices for orientating optical elements are necessary in many applications, in particular in applications concerned with laser manipulation processes such as laser scanning, laser engraving, laser marking, laser ablation or laser etching, but also in other applications which necessitate deflection of a light beam, whether incoherent, coherent or partially coherent, in a controllable manner.

Hereby, there remains a need in the art for an improved way to control the motion of the rotational axis of electrically actuated devices such as devices for orientating optical elements. Particularly, high precision in the orientation of the axis is required, allowing smooth rotation of the axis while complying with very stringent constraints with respect to axial position in both manufacturing and operations.

U.S. Pat. No. 7,130,094 provides a device for deflecting a laser beam, comprising at least a single sided mirror and means for orientating said mirror, wherein said single sided mirror is attached on one end of said axis such that it can rotate about said axis and, that the means for orientating said mirror comprise means for providing a magnetic field and means for providing a charged particle having a velocity v, whereby the orientation of said mirror is controlled by the resulting Lorentz force. The device according to U.S. Pat. No. 7,130,094 however lacks provisions to meet stringent constraints with respect to axial position.

U.S. Pat. No. 5,422,471 discloses a scanning device for projecting a light beam against a target having information contained thereon which is to be scanned by the light beam; and in particular relates to a compact laser scanning device, such as a bar code projecting a laser beam, and which device incorporates a drive component such as a scanning motor for oscillating a scanning element or mirror at a high rate of speed within a specified angular range so as to cause the light or laser beam which impinges against the information on the target to be rapidly swept across the information in a scanning sequence. The device according to U.S. Pat. No. 5,422,471 however does not allow to meet stringent constraints with respect to axial position.

EP 3 158 381 describes an apparatus and a method for positioning an optical element, said apparatus comprising a positionable part to which the optical element can be mounted; a base part; a suspension system, said positionable part being mounted on said base part in a movable manner with said suspension system; an actuation system for actuating movement of said positionable part with respect to said base part; and a control system for controlling movement of said positionable part. EP 3 158 381 however is not aimed at a device with a rotational axis.

The present invention aims to resolve at least some of the problems mentioned above.

SUMMARY OF THE INVENTION

In a first aspect, the invention provides an electrically actuated device for orientating an optical element around a rotational axis according to claim 1. Hereby, said axial force is a force in a direction parallel to the axis, as opposed to a radial force, referring to a force in a direction perpendicular to the axis. The bearings are preferably angular contact bearings, more preferably ball bearings.

The advantage of such a device lies in the advantageous reliance on clamping to hold the inner parts of the bearings against the axis. In prior art systems, this is commonly done by means of gluing or based on radial forces exerted by the inner parts of the bearings on the axis. However, glue may cause bearings to malfunction, and the inventor has found that this is a particularly difficult problem for electrically actuated devices for orientating an optical element, as these require fast and accurate orientation of the axis and optical element. For instance, the glue may enter the bearing during manufacturing, or the device wear may cause pulverized portions of glue to enter the bearing, which is undesirable. On the other hand, radial forces exerted by inner parts of the bearing on the axis may result in accelerated wear of the bearing and/or the axis and may also cause deformation of the bearing, leading to malfunctioning of the bearing. The present invention overcomes this by relying on axial-force-based clamping to hold the inner parts of the bearings against the axis. This axial force is overall desirable, as it may allow axial preloading of the bearings.

A further advantage of the present invention lies in the enabling of preloading the bearings, which may result from said axial force. As the bearings are provided in pair, the bearings constitute a preloaded pair, a constellation which is known to provide several advantages. For instance, in a preferred embodiment where the bearings are ball bearings, preloaded pairs may have improved axial runout as the necessary slight clearance between the bearing balls and races, which acts as a mechanical buffer, may be taken up in part by an appropriate axial force. Furthermore, in a preferred embodiment with angular contact bearings, the asymmetric design of the each bearing supports axial forces in only one direction, making axial preloading recommendable. In a preferred embodiment, also the outer parts of the bearing may be held together around the axis by relying on axial-force-based clamping. On the one hand, this may further contribute to said preloading. On the other hand, this may overcome problems arising in the use of glue or the problems entailed by relying on radial forces to hold parts of the bearings in position. In a related preferred embodiment, said axis-related clamping means and/or said bearings-related clamping means are further configured to exert said axial force as a preloading force for axially preloading said bearings, wherein said preloading force is preferably determined based at least partly on a bearing tolerance associated with at least one of the bearings. In such an embodiment, the invention provides a solution to the problem of being faced with a large tolerance for one or more of the bearings. In another related embodiment, said axis-related clamping means and/or said bearings-related clamping means are further configured to exert said axial force as a preloading force for axially preloading said bearings, wherein said preloading force is preferably determined based at least partly on a minimal force required in order to prevent a ball belonging to one of the bearings from sliding instead of rolling. In such an embodiment, the invention may provide a solution to a variety of problems relating to the rolling of the balls in the bearings, which may for instance relate to inadequate lubrication or to wear of the bearings.

Furthermore, gluing is a time-consuming step in the production process. Due to the typically small physical dimensions of the bearings, it may be infeasible to perform the gluing without some kind of visual aid. Such visual aids may for instance concern a magnifying means or a digital monitor, all of which lead to a slower or more complex mounting. Moreover, the process of adding glue may be prone to error, and involve a considerable percentage of workpieces being damaged, with e.g. portions of glue ending up in or on the stator and/or on the rotor. Likewise, mounting the bearings may be difficult where radial forces are brought into play. For instance, it may be problematic to mount a bearing on/over an axis where the inner part of the bearing exerts a radial force on the axis. This may be further complicated by the small physical dimensions of the components, which lead to an increased risk of damaging a component during the mounting.

Finally, gluing usually does not allow replacement of broken parts. Hence, when e.g. a bearing is worn out, there is no easy or fast way to replace the bearing. Similarly, replacement of broken parts may be problematic when radial forces are brought into play. For instance, where the inner part of the bearing exerts a radial force on the axis, the removal of the bearing may damage the axis, or it may prove difficult to install the new bearing replacing a defective bearing. The difficulty may arise from the radial force itself, or from the limited physical dimensions, again leading to increased risk of damaging the component during the mounting.

In a second aspect, the present invention provides a system for deflecting a laser beam according to claim 17. The advantages are similar to those of the device according to the present invention.

In a third aspect, the present invention provides a kit for deflecting a laser beam according to claim 18. The advantages are similar to those offered by the device and the system.

In a further aspect, the present invention provides a spring-based suspension means configured for suspending an axis belonging to an electrically actuated device. Such a suspension means is advantageous in that it offers rigidity in radial direction and flexibility in axial direction for said axis by axial-force-based clamping an outer part of a bearing. This may be particularly advantageous for adequate tuning of said axial force as preloading force with respect to a preloaded pair of bearings, preferably angular contact bearings, since it is commonly known that the preloading force in such a set-up must be adjusted with care. Basically, the preloading force deducts from the axial loading capacity of the bearings, and hence should be only as large so as to realize the preloading that is required in view of the mechanical properties and the tolerances of the bearings and/or the axis. Hereby, the suspension means preferably exerts said axial force only on an outer rim of said outer part of the bearing. This is advantageous because acting on the outer rim, rather than at other portions of the outer part of the bearing, the suspension provides for superior positioning while interfering minimally with the operation of the bearing. Particularly, the outer part of the bearing may be seen as a lever, whereby the suspension according to the present invention is provided there where leverage is maximal, leading to suspension with superior positioning. Moreover, avoiding contact with other portions of the outer part of the bearing may be important for correct operation of the bearing. For instance, in case of a ball bearing, it may be undesirable to exert axial force near the centers of the ball riding in the bearing. Furthermore, the spring-based suspension means comprises at least one leaf spring, a type of spring that allows for simple and accurate provision of the required axial force, with limited associated radial force.

Further embodiments and their advantages are described in the detailed description and the claims.

DETAILED DESCRIPTION OF THE INVENTION

Figure 1:
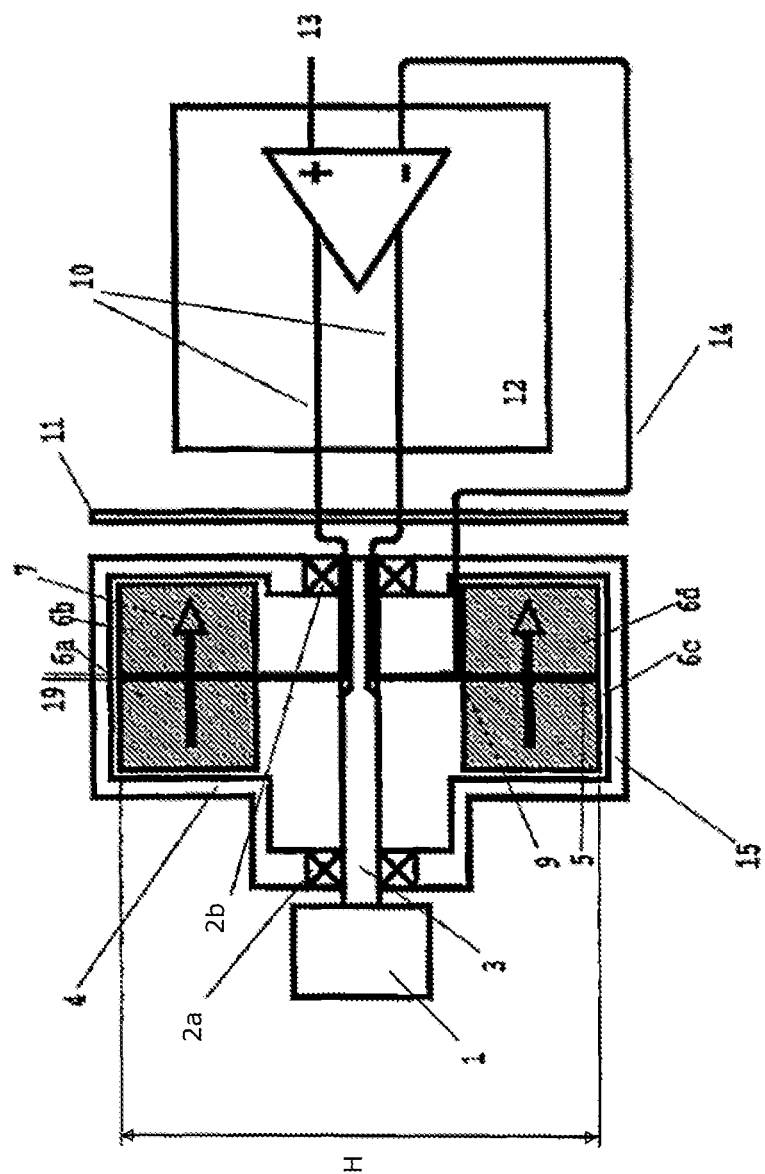
FIG. 1 shows an axial cross-sectional view of a prior art device.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In this document, an "axial force" is a force in a direction parallel to the axis, whereas a "radial force" refers to a force in a direction perpendicular to the axis. In general, a force may comprise both an axial force component and a radial force component. In this document, the term "angular contact bearing" refers to a bearing with axially asymmetric bearings. In a preferred embodiment, both bearings are angular contact bearings and/or ball bearings, more preferably angular contact ball bearings.

In this document, the terms "optical" and "electronic" may refer to opposite directions with respect to the axis of the device, whereby the "optical end" of the axis is the end pointing toward the position where the optical element may be provided, whereas the "electronic end" refers to the other end, which in a preferred embodiment is pointing toward the position where the electric actuation, e.g. a regulator, is provided. These terms hence refer merely to opposite directions and hence should not be construed as implying any limitation with respect to any optical or electronic aspect of the invention. Furthermore, the first bearing is "associated" with said optical end, whereas the second bearing is "associated" said electronic end. Hereby, the term "associated" is be construed as meaning that the distance between the first bearing and the optical end is smaller than the distance between the second bearing and the optical end, and that, likewise, the distance between the second bearing and the electronic end is smaller than the distance between the first bearing and the electronic end. Conversely, the term "associated" is be construed as meaning that the distance between the first bearing and the location where the optical element may be provided is smaller than the distance between the second bearing and said location. The first and second bearing may hence be provided near opposite ends of the axis, but may as well both be provided near one end of the axis, or both near the middle of the axis. Alternatively, one bearing may be provided near an end of the axis, whereas the other bearing may be provided near the middle of the axis.

In this document, "angle rotation" means any rotational movement over an angular reach, which angular reach may be positive or negative and being preferably smaller than 180°.

In this document, the terms "male type connector" and "female type connector" refer to the common convention to assign the designation male or female to mating connecting parts. Hereby, the part bearing a protrusion and/or which fits inside the other is designated male in contrast to the part containing the corresponding indentation and/or is fitting outside the other, being designated female.

In the summary section, several aspects offered by the invention are described. The embodiments stated in this document may hereby relate to each of the aspects provided by the invention. It will e.g. be clear to the skilled person that a measure or feature applied to the device in a preferred embodiment may equally be applied to the system, the kit or to the spring-based suspension means of the present invention.

In a preferred embodiment, the device further comprises bearings-related clamping means configured to exert said axial force on the outer parts of the bearings toward each other for axially clamping the axis, thereby radially fixating said outer parts of the bearings with respect to the stator. In such an embodiment, both the axis and the bearings are held in place by advantageous axial-force-based clamping. This allows to avoid the use of glue or the reliance on the exertion of radial force for this purpose.

In another preferred embodiment, said bearings-related clamping means comprises suspension means for providing rigidity in radial direction and flexibility in axial direction for said axis, and wherein said suspension means is configured to suspend said axis via said first bearing associated with said optical end. Such suspension is advantageous in order to sustain an adequate axial force as preloading force with respect to the bearings. As mentioned elsewhere in this document, the preloading force must be adjusted with care, since it deducts from the axial loading capacity of the bearings, and should only be as large as required in view of the mechanical properties and the tolerances of the bearings and/or the axis.

In a preferred embodiment, said suspension means is configured to exert said axial force only on an outer rim of said outer part of the first bearing; wherein said outer part comprises a bearing rotation axis 80 and an outer diameter D; and wherein said outer rim corresponds to portions of the outer part distanced for at least an outer rim diameter E from said bearing rotation axis 80, said outer rim diameter E being not smaller than 85% of said outer diameter D, preferably not smaller than 90% of said outer diameter D, more preferably not smaller than 95% of said outer diameter D. This is advantageous because acting on the outer rim, rather than at other portions of the outer part of the bearing, the suspension provides for superior positioning while interfering minimally with the operation of the bearing. Moreover, avoiding contact with other portions of the outer part of the bearing may be important for correct operation of the bearing. For instance, in case of a ball bearing, it may be undesirable to exert axial force near the centers of the ball riding in the bearing.

In another preferred embodiment, said suspension means comprises at least one leaf spring, preferably at least three leaf springs, more preferably three leaf springs.

Such a type of spring allows for simple and accurate provision of the required axial force, with limited associated radial force, as desired. This accuracy is particularly advantageous in view of the need to accurately tune the preloading force exerted on the bearings.

In yet another preferred embodiment, said suspension means is essentially ring-shaped and comprises an outer contour and an inner contour, wherein said at least one leaf spring extends along a tangential direction with respect to said outer contour, and wherein at least 50% of said outer contour belongs to any of said at least one leaf spring. Hereby, said feature of being essentially ring-shaped relates to the outer contour and the inner contour being essentially circular. This is advantageous because the outer part of the bearing preferably also has an essentially circular shape, and hence, the axial force carried from stator-related portions of the device to the bearings may be spread over several zones of the ring, allowing smaller forces per unit of surface and/or per unit of volume. The advantageous extending of the at least one leaf spring over the outer contour likewise allows to spread the axial force, leading to smaller forces per unit of surface and/or per unit of volume.

In a preferred embodiment, said suspension means is essentially ring-shaped and comprises an outer contour and an inner contour, and wherein said suspension means comprises an essentially conical surface provided near said inner contour for radial fixation of said outer part of the first bearing. Such an essentially conical surface is advantageous because it allows for a slide fit between the suspension means and the bearing. The advantage hereof may be further understood from Example 2.

In yet another embodiment, said axis comprises an essentially conical surface configured for said radial fixation of said axis with respect to each of the inner parts of the bearings, said radial fixation based at least partly on radial fixation of said conical surface. Having said axis comprise a conical surface is advantageous because it allows for a slide fit. Moreover, by providing clamping means of the male-connector-type on the axis and using the inner part of the bearings as female-type connector, a particularly compact design of the axis is realized, which minimizes inertia of the axis under rotation. This contrasts with a case where the clamping means on the axis would be of the female-type-connector for mating with the outer parts of the bearings, which would lead to a larger diameter for the axis, and increased inertia.

In yet another embodiment, said first and said second axial rotation bearings are ball bearings comprising an inner race and an outer race, said inner race comprised in said inner part and said outer race comprised in said outer part. This choice of bearings may be advantageously combined with several aspects of the invention, such as the suspension means being configured to exert said axial force only on an outer rim of the outer part of the bearing. In this way, it is avoided that axial force is exerted near the centers of the balls riding in the bearing.

In another embodiment, said conductor comprises radially extending conductor parts defining a conductor angular reach, wherein the magnetic field generating means are a plurality of magnetic anchor pairs, preferably four magnetic anchor pairs, and wherein said radially extending conductor parts are positioned inside said magnetic field.

In yet another embodiment, the angular reach defined by each magnetic anchor has a spatial overlap with the corresponding angular reach defined by the conductor, and whereby the excess of angular reach of the anchor corresponds to the angular reach for the orientation of the axis.

In another embodiment, said axial clamping of said axis by means of at least said axis-related clamping means does not involve gluing; preferably wherein said axial clamping of said axis by means of said axis-related clamping means and said bearings-related clamping means does not involve gluing. This is advantageous since it prevents issues with glue during operation and manufacturing, by relying on the advantageous axial-force-based clamping provided by the present invention.

In a preferred embodiment, the axis-related clamping means relate to a conical axis surface provided on the axis near the electronic end of the axis, wherein a sliding fit between said conical surface and the inner part of the second bearing is realized to enable a friction-based radial fixation of the axis with respect to the inner part of the second bearing, wherein preferably the axis-related clamping means relate to a transverse surface provided on the axis near the optical end of the axis, and wherein preferably a transition fit between said transverse surface and the inner part of the first bearing is realized to enable a position-based radial fixation of the axis with respect to the inner part of the first bearing. With such an embodiment, the invention advantageously provides complementary roles for the fits involved in the axis-related clamping. Hereby, the sliding fit, allowing for more play, is beneficially associated with the electronic end of the axis, whereas the transition fit, allowing for less play, is associated with the optical end of the axis. This choice is advantageous in that the end requiring most accurate positioning, i.e. the optical end, is provided with the most stable and reliable type of fit. Furthermore, by providing clamping means of the male-connector-type on the axis and using the inner part of the bearings as female-type connector, a particularly compact design of the axis is realized, which minimizes inertia of the axis under rotation. This contrasts with a case where the clamping means on the axis would be of the female-type-connector for mating with the outer parts of the bearings, which would lead to a larger diameter for the axis, and increased inertia. Finally, such a sliding fit may also be beneficial to handle bearings with larger tolerance. In such case, the sliding fit according to the present invention may compensate for deviations of, e.g., the outer contour of the bearing, which may, e.g., deviate significantly from a circle shape.

In a preferred embodiment, the bearings-related clamping means relate to a conical stator-related surface provided on a stator-related portion of the device configured for receiving the outer part of the second bearing, wherein a sliding fit between said conical stator-related surface and the outer part of the second bearing is realized to enable a friction-based radial fixation of the outer part of the second bearing with respect to the stator, wherein preferably the axis-related clamping means relate to a conical suspension-related surface, and wherein preferably a sliding fit between said conical suspension-related surface and the outer part of the first bearing is realized to enable a friction-based radial fixation of the outer part of the first bearing with respect to the stator. Hereby, "stator-related" refers to any portion of the device that is comprised in or attached to the stator and hence does not follow the motion of the rotor. By providing clamping means of the female-connector-type on stator-related portions and using the outer part of the bearings as male-type connector, again a particularly compact design of the axis is realized, which minimizes inertia of the axis under rotation. Furthermore, the embodiment advantageously uses the elasticity provided by the suspension means to combine a sliding fit with the outer part of the first bearing with a sliding fit with the outer part of the second bearing.

In one embodiment, one or more anchors, preferably all the anchors, have intra-anchor sleeves in order to close the magnetic field lines. These intra-anchor sleeves may be similar to those described by reference numeral 20 on FIG. 1 of U.S. Pat. No. 7,130,094, i.e. intra-anchor sleeves defined at least in part by geometric planes that extend radially from the axis, whereby intra-anchor sleeves of anchor pairs are preferably aligned, i.e. they are preferably defined by common geometric planes.

In another preferred embodiment the rotor comprises a circuit support whereon the conductor is provided connected to the axis and whereby the conductor preferably exists of radial extending conductor parts. Said conductor defines a conductor angular reach, i.e. the angle between the most left and most right, preferably radial extending conductor part. In a preferred embodiment the conductor describes a circle segment. In an example the conductor extends in one or more turns or loops on a printed circuit board. In a preferred embodiment the current wires extend perpendicular to the magnetic field lines. In a preferred embodiment the rotor is provided with a current wire or with current wires, of which an essential part extends radially.

In another preferred embodiment the conductor angular reach is defined by a circuit comprising an electrical conductor provided in a specific pattern on the circuit support for example in a continuous circle segmented pattern around the axis having at least one, preferably more than one loop or turn.

The invention is further described by the following non-limiting examples which further illustrate the invention, and are not intended to, nor should they be interpreted to, limit the scope of the invention.

EXAMPLES

Example 1: Prior Art Device

FIG. 1 shows an axial cross-sectional view of a prior art device relating to U.S. Pat. No. 7,130,094. The device comprises a housing 15 and a regulator 12, whereby a mirror 1 is fixed on the axis 3 and the housing 15 is provided with a first bearing 2a and a second bearing 2b, to bear and let the axis 3 circulate.

The circuit support 5 is fixed on the axis 3 and rotates back and forwards and in the sleeve 19 between the poles of two pairs of magnetic anchors 6 *a/b* and 6 *c/d*. The static magnetic field 7 is present between the poles of the magnetic anchor pair. The device further comprises electrical conductors 10 which connect the rotor with the regulator printed circuit board 11, on which the regulator 12 is mounted. Regulation is done by comparison of a control signal 13 with the signal 14 from a positioning measurement means 9, both signals sent to the regulator 12.

The mirror 1 is able to reflect a laser beam (not shown) to a work piece (not shown). In order to let the laser beam describe a certain route, the mirror 1 has to rotate back and forwards, regulated by a regulation signal, generated by the regulator 12. In order to rotate back and forwards, the mirror 1 is fixed to the axis 3. The resulting force acting on the rotor assembly 3,5 rotates the mirror 1. A preferred rotation range of the mirror 1 is two times (back and forth) 22,50.

The stator 6 can comprise permanent magnets or electromagnets. The stator 6 comprises one or more anchor pairs, e.g. two anchor pairs 6 *a/b* and 6 *c/d*. The two parts of an anchor pair are positioned pole to pole, separated by a thin air sleeve 19 wherein the rotor assembly (3,5) can rotate freely.

A magnetic field has to be present, wherein the rotor assembly (3, 5) can rotate. The direction of the magnetic field is preferably perpendicular to the current through electrical conductors comprised in the support 5, as shown in FIG. 1, in order to create the Lorentz force, which corresponds to the rotation 21 of the axis 3 and to the resulting oscillation of the mirror 1.

The angular reach of the anchors is preferably larger than the rotation range of the support 5, in order to let the support 5 rotate over his range. In case the rotation range is 2×22.5°, the angular reach of the anchors is preferably about 70°.

The anchors have sleeves (not shown) in order to close the magnetic field lines. The stator 6 is fixed permanently in the housing 15. The height of the stator 6 decides the inner height of the motor assembly. Preferably it will have a height H of 1 to 10 cm. The steering signal is produced by the regulator 12. Besides the control signal 13, the regulator receives also a signal 14 from the positioning measurement 9.

Example 2: Example Embodiment of the Device of the Present Invention

Figure 2:
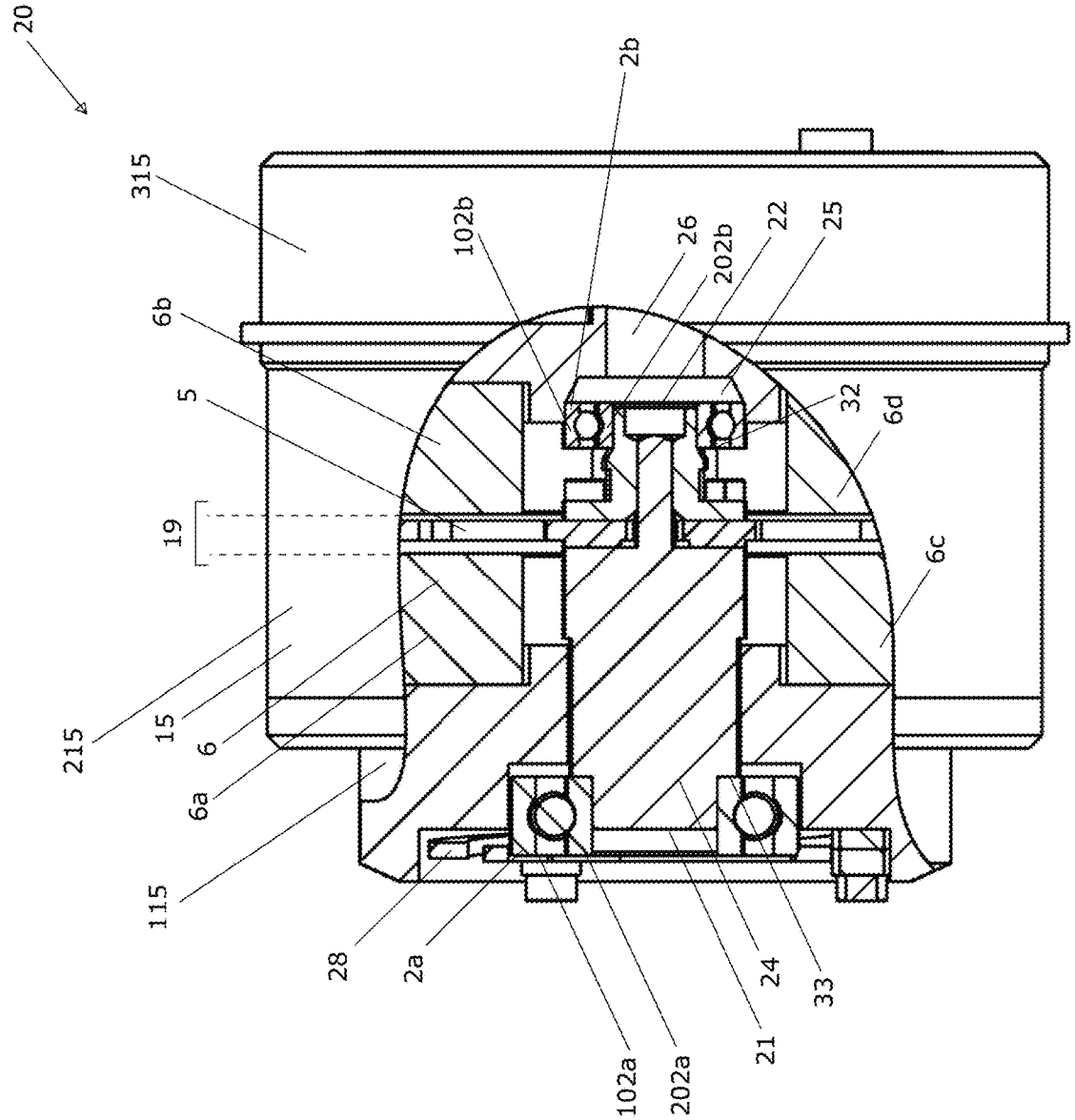
FIG. 2 shows an axial cross-sectional cut-away view of an example embodiment of the device of the present invention.
Figure 3:
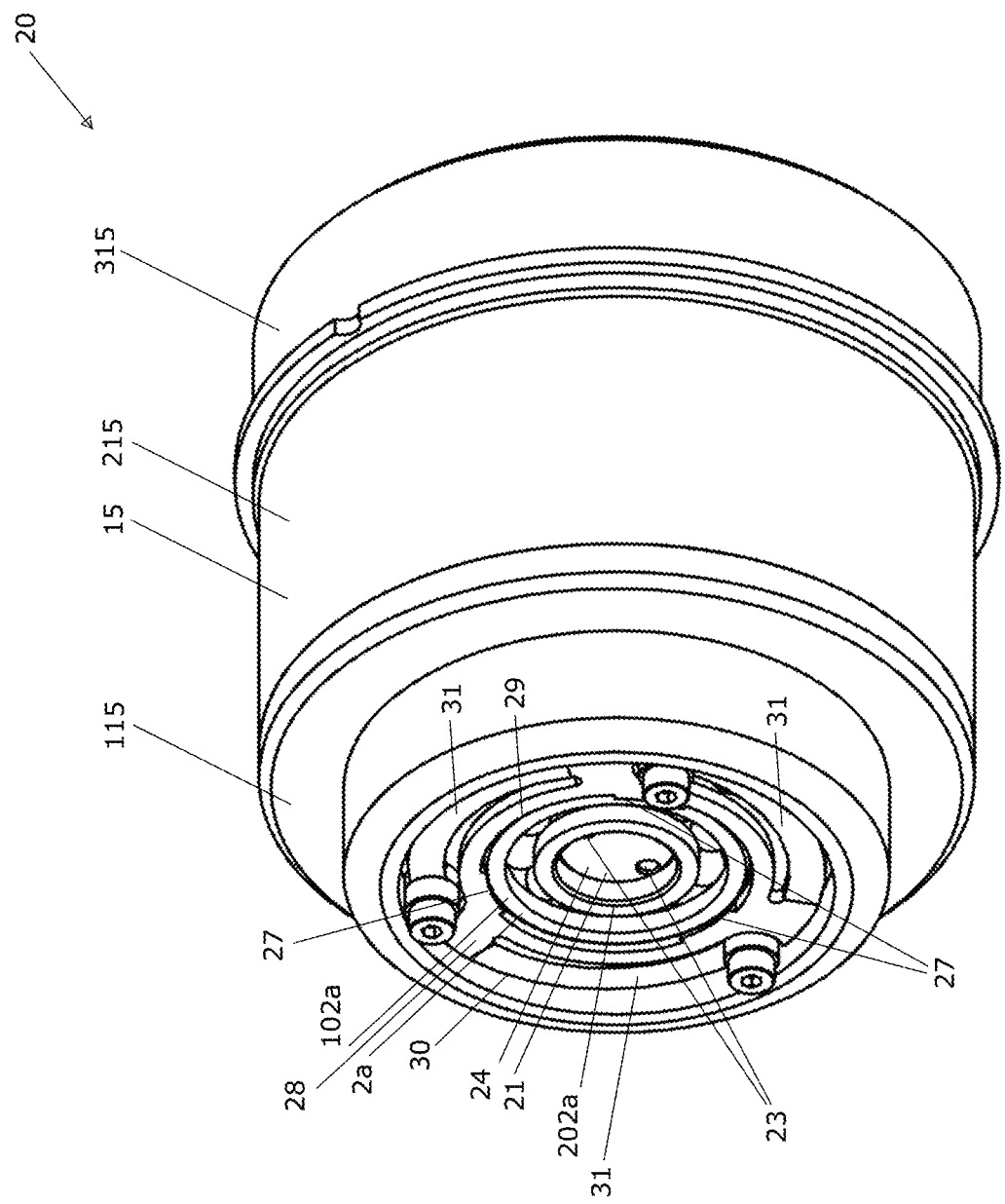
FIG. 3 shows a perspective view of an example embodiment of the device of the present invention.
Figure 4:
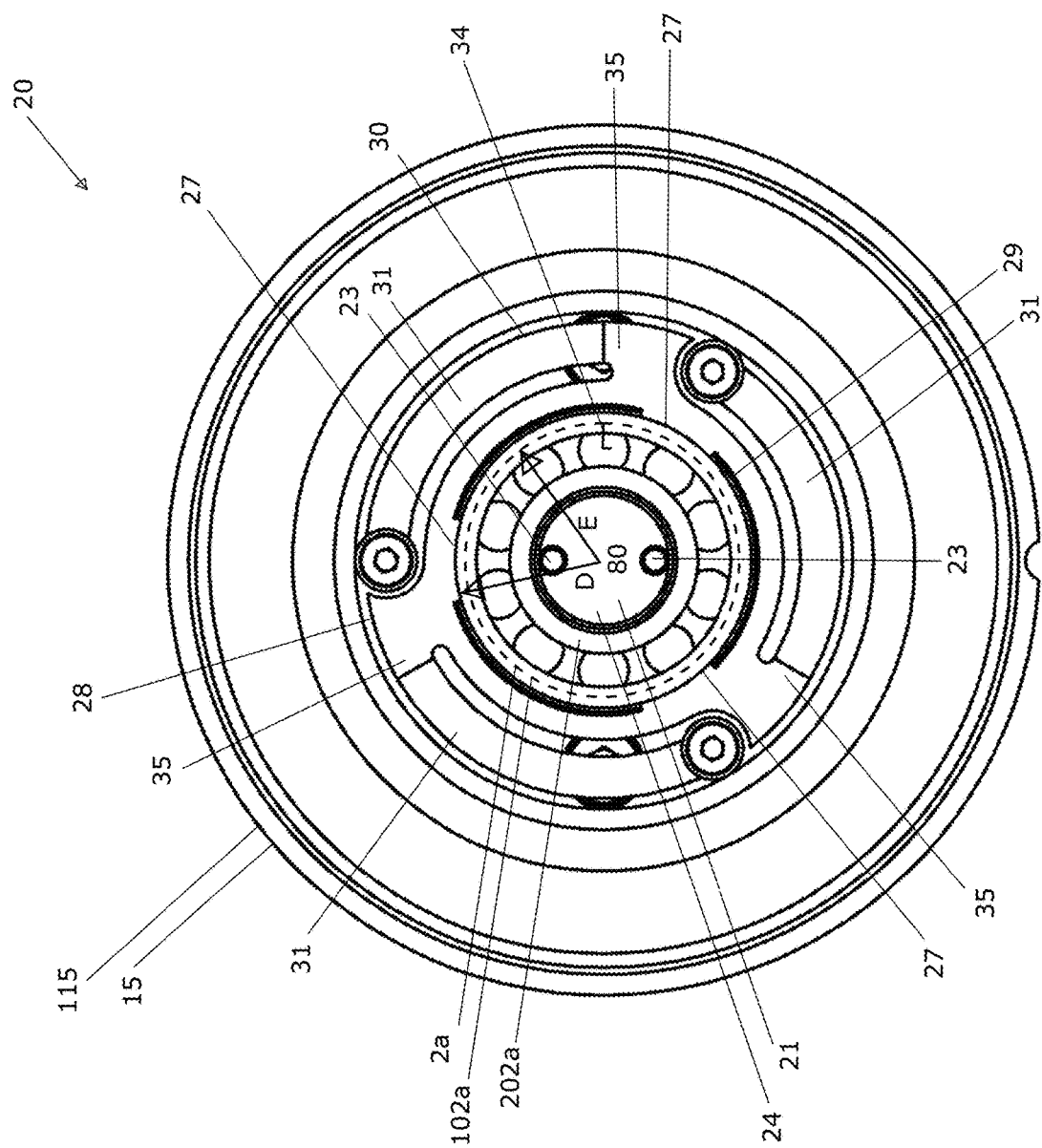
FIG. 4 shows a side view of an example embodiment of the device of the present invention.
Figure 5:
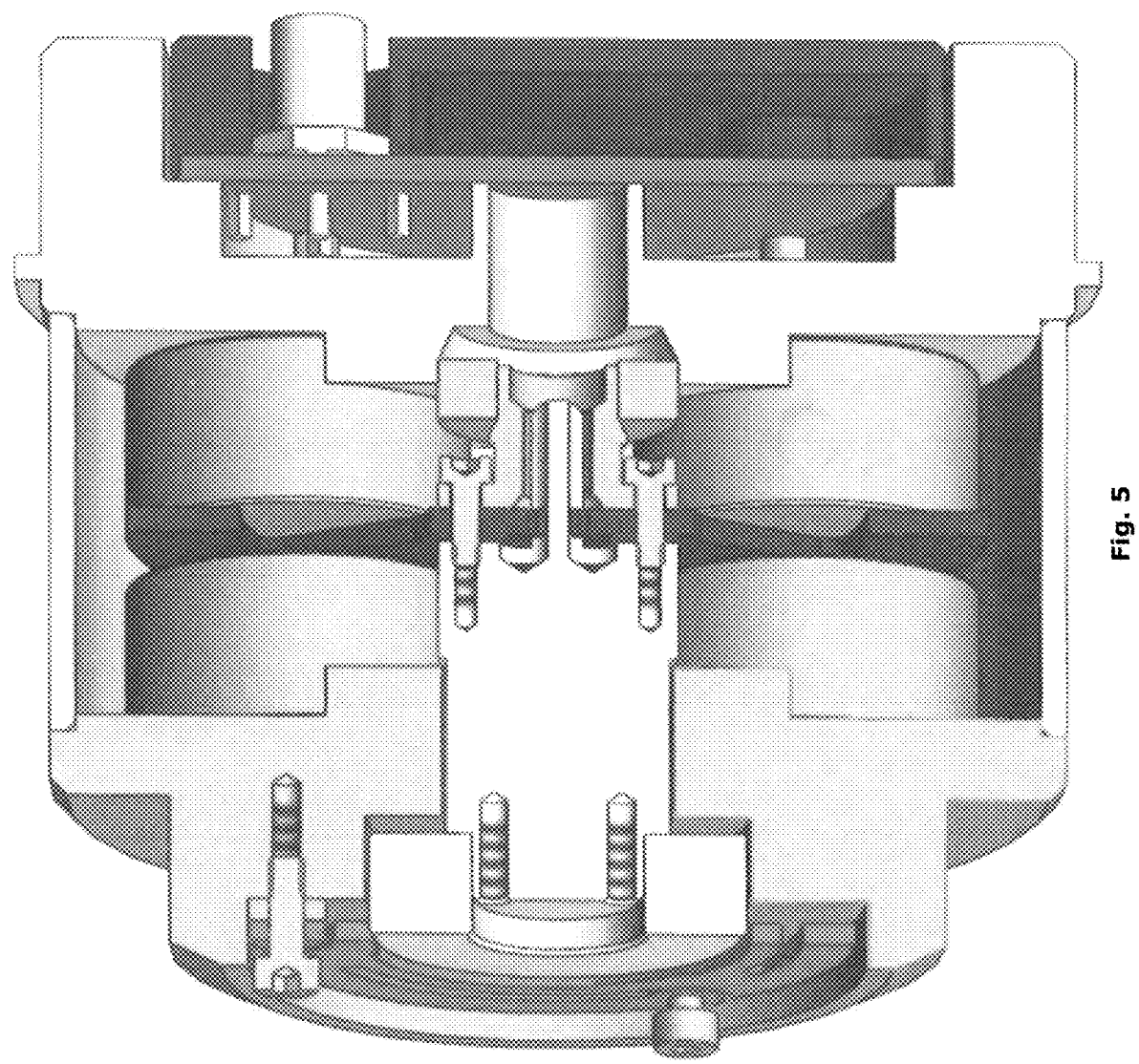
FIG. 5 shows a perspective view of an example embodiment of the device of the present invention.

FIG. 2 shows an axial cross-sectional cut-away view of an example embodiment of the device 20 according to the present invention. For the same example embodiment, FIG. 3 shows a perspective view, while FIG. 4 shows a side view.

The device 20 is adapted for orientating an optical element, in this example a mirror, around a rotational axis 3 comprising a rotor 24 and a stator 6, said rotor 24 comprising said axis 3. Said axis comprises an optical end 21 and an electronic end 22. The stator 6 comprises a means for generating a magnetic field 6a, 6b, 6c, 6d, i.e. four magnetic anchor pairs, of which a first pair 6a, 6b and a second pair 6c, 6d are visible on FIG. 2.

The device 20 further comprises a first ball bearing 2a associated with said optical end 21 and a second ball bearing 2b associated with said electronic end 22. Each ball bearing 2a, 2b comprises an inner part 102a, 102b with an inner race and an outer part 202a, 202b with an outer race, wherein a plurality of balls comprised in the ball bearing may ride.

The device 20 further comprises electronic actuation means, i.e. a regulator (not shown) for providing a charged particle having a velocity v moving through a conductor provided on said rotor 24. Particularly the conductor is provided on a circuit support 5 comprised in the rotor 24.

The axis 3 is able to perform a rotational movement over less than 180°, whereby the orientation of said axis 3 is controlled by a Lorentz force resulting from said charged particle moving in said magnetic field.

The device 3 comprises axis-related clamping means configured to exert an axial force on the inner parts 202a, 202b of the bearings 2a, 2b toward each other for axially clamping said axis 3, thereby radially fixating said axis 3 with respect to each of the inner parts 202a, 202b of the bearings 2a, 2b.

The device 20 further comprises bearings-related clamping means configured to exert said axial force on the outer parts 102a, 102b of the bearings 2a, 2b toward each other for axially clamping the axis 3, thereby radially fixating said outer parts 102a,102b of the bearings 2a, 2b with respect to the stator 6.

The bearings-related clamping means comprises suspension means 28 for providing rigidity in radial direction and flexibility in axial direction for said axis 3. The suspension means 28, i.e. a spring-based suspension means 28, is configured to suspend said axis 3 via said first bearing 2a associated with said optical end 21.

The spring-based suspension means 28 is configured to exert said axial force only on an outer rim 34 of said outer part 102a of the first bearing 2a. Hereby, said outer part 102a comprises a bearing rotation axis 80 and an outer diameter D, and said outer rim 34 corresponds to portions of the outer part 102a distanced for at least an outer rim diameter E from said bearing rotation axis 80, said outer rim diameter E being not smaller than 80% of said outer diameter D, preferably not smaller than 90% of said outer diameter D.

The spring-based suspension means 28 comprises three leaf springs 31. It is essentially ring-shaped and comprises an outer contour 30 and an inner contour 29. The three leaf springs 31 extend along a tangential direction with respect to said outer contour 30, and at least 50% of the outer contour 30 belongs to any of said at least one leaf spring 31. Particularly, only a small portion of the outer contour 30 does not belong to the leaf springs, i.e. the stem points 35 connecting the stem of the leaf springs 31 to the rest of the spring-based suspension means 28. Furthermore, the spring-based suspension means 28 comprises an essentially conical surface 27 provided near said inner contour 29 for radial fixation of said outer part 102a of the first bearing 2a. Particularly, the conical surface 27 consists of three conical surface protrusions 27 spread evenly over the circumference of the inner contour 29.

The device 20 further comprises a housing 15 and a regulator (not shown), whereby an optical element, preferably a mirror (not shown) may be attached on the optical end 21 of the axis 3. To this end, optical element attachment means 23 may be provided, in the example being a pair of optical element attachment points 23.

The housing comprises an optical end housing part 115, a housing jacket 215 and an electronic end housing part 315.

The circuit support 5 is fixed on the axis 3 and rotates back and forwards and in the sleeve 19 between the poles of the four pairs of magnetic anchors, of which two pairs 6 a/b and 6 c/d are shown. The static magnetic field is present between the poles of the magnetic anchor pair. The device further comprises regulator-related electrical conductors (not shown) which connect the rotor 24 with the regulator printed circuit board (not shown) on which the regulator is mounted. Hereby, the regulator-related conductors may be guided to the rotor via a duct 26 provided in the electronic end housing part 315. Regulation is done by comparison of a control signal with the signal from a positioning measurement means (not shown), whereby both signals are sent to the regulator.

Said duct 26 provided in the electronic end housing part 315 comprises an optical duct end 25 and an electronic duct end (not shown).

The axis-related clamping means relate to a conical axis surface 32 provided on the axis near the electronic end 22 of the axis 3, wherein a sliding fit between said conical surface and the inner part 202b of the second bearing 2b is realized to enable a friction-based radial fixation of the axis 3 with respect to the inner part 202b of the second bearing 2b, wherein preferably the axis-related clamping means relate to a transverse surface 33 provided on the axis near the optical end 21 of the axis, and wherein preferably a transition fit between said transverse surface 33 and the inner part 202a of the first bearing 2a is realized to enable a position-based radial fixation of the axis with respect to the inner part 202a of the first bearing 2a.

Furthermore, the bearings-related clamping means relate to a conical stator-related surface 25 which is provided on a stator-related portion of the device, i.e. said optical duct end 25, and is configured for receiving the outer part 102b of the second bearing 2b. A sliding fit between said optical duct end 25 and the outer part 102b of the second bearing 2b is realized to enable a friction-based radial fixation of the outer part 102b of the second bearing 2b with respect to the stator 6. Furthermore, the axis-related clamping means relate to a conical suspension-related surface, i.e. three conical surfaces 27 provided on the inner contour 29 of the suspension means 28, and wherein preferably a sliding fit between said three conical surface protrusions 27 and the outer part 102a of the first bearing 2a is realized to enable a friction-based radial fixation of the outer part 102a of the first bearing 2a with respect to the stator 6.

The axis 3 comprises an essentially conical surface 32 configured for said radial fixation of said axis 3 with respect to each of the inner parts 202a, 202b of the bearings 2a, 2b, said radial fixation based at least partly on radial fixation of said conical surface 32.

The first and said second bearings 2a, 2b are ball bearings comprising an inner race and an outer race, said inner race comprised in said inner part and said outer race comprised in said outer part.

The axial clamping of said axis 3 by means of said axis-related clamping means and said bearings-related clamping means does not involve gluing.

The conductor comprises radially extending conductor parts defining a conductor angular reach, wherein the magnetic field generating means are a plurality of magnetic anchor pairs 6 a/b, 6 c/d, preferably four magnetic anchor pairs. Said radially extending conductor parts are positioned inside said magnetic field. The angular reach defined by each magnetic anchor 6a, 6b, 6c, 6d has a spatial overlap with the corresponding angular reach defined by the conductor, and whereby the excess of angular reach of the anchor 6a, 6b, 6c, 6d corresponds to the angular reach for the orientation of the axis 3.

The mirror 1 is able to reflect a laser beam (not shown) to a work piece (not shown). In order to let the laser beam describe a certain route, the mirror 1 has to rotate back and forwards, regulated by a regulation signal, generated by the regulator. In order to rotate back and forwards, the mirror may be fixed to the axis 3. The resulting force acting on the rotor 24 rotates the axis 3 and hence the mirror. A preferred rotation range of the axis and hence the mirror is two times (back and forth) 22.5°.

The stator 6 can comprise permanent magnets or electromagnets. The stator 6 comprises one or more anchor pairs; in this example the number of anchor pairs is four, whereby two anchor pairs 6 a/b and 6 c/d are shown on FIG. 2. In alternative embodiments, which equally fall under the scope of the present invention, the number of anchor pairs 6 a/b and 6 c/d is 1, 2, 3, 5, 6, 7, 8 or more than 8. The two parts of each anchor pair are positioned pole to pole, separated by said thin air sleeve 19 wherein the rotor 24, particularly the circuit support 5 and the conductors provided thereupon, can rotate freely.

A magnetic field has to be present, wherein the rotor 24 can rotate. The direction of the magnetic field is preferably perpendicular to the current through electrical conductors comprised in the support 5, in order to create the Lorentz force, which corresponds to the rotation of the axis 3 and to the resulting oscillation of the optical element.

The angular reach of the anchors is preferably larger than the rotation range of the support 5, in order to let the support 5 rotate over his range. In case the rotation range is 2×22.5°, the angular reach of the anchors is preferably about 70°.

In one example embodiment, one or more anchors, preferably all the anchors, have intra-anchor sleeves (not shown) in order to close the magnetic field lines. These intra-anchor sleeves may be similar to those described by reference numeral 20 on FIG. 1 of U.S. Pat. No. 7,130,094, i.e. intra-anchor sleeves defined by geometric planes that extend radially from the axis 3, whereby intra-anchor sleeves of anchor pairs 6 a/b and 6 c/d are aligned, i.e. they are defined by the same geometric planes. These intra-anchor sleeves are to be distinguished from air sleeve 19 which concerns an inter-anchor sleeve. The stator 6 is fixed permanently in the housing 15. The height of the stator 6 decides the inner height of the motor assembly. Preferably it will have a height 24 of 1 to 10 cm. The steering signal is produced by the regulator 12. Besides the control signal 13, the regulator receives also a signal 14 from the positioning measurement 9.

It is supposed that the present invention is not restricted to any form of realization described previously and that some modifications can be added to the presented example of fabrication without reappraisal of the appended claims. For example, the present invention has been described whereby the spring-based suspension means is applied to one specific device, but it is clear that the spring-based suspension means can be applied in a wide range of different electrically actuated devices comprising a rotational axis and bearings.

The invention claimed is:

1. An electrically actuated device for orientating an optical element around a rotational axis comprising a rotor and a stator, said rotor comprising said axis, said axis comprising an optical end and an electronic end, the stator comprising a means for generating a magnetic field; the device further comprising a first axial rotation bearing associated with said optical end and a second axial rotation bearing associated with said electronic end, each bearing comprising an inner part and an outer part; said device further comprising electronic actuation means for providing a charged particle having a velocity v moving through a conductor provided on said rotor,
    wherein the axis is able to perform a rotational movement over less than 180°, and whereby the orientation of said axis is controlled by a Lorentz force resulting from said charged particle moving in said magnetic field:
    wherein said device comprises axis-related clamping means configured to exert an axial force on the inner parts of the bearings toward each other for axially clamping said axis, thereby radially fixating said axis with respect to each of the inner parts of the bearings;
    wherein said device further comprises bearings-related clamping means configured to exert said axial force on the outer parts of the bearings toward each other for axially clamping the axis, thereby radially fixating said outer parts of the bearings with respect to the stator.

2. Device according to claim 1, wherein said axis-related clamping means and/or said bearings-related clamping means are further configured to exert said axial force as a preloading force for axially preloading said bearings, wherein said preloading force is determined based at least partly on a bearing tolerance associated with at least one of the bearings.

3. Device according to claim 1, wherein said axis-related clamping means and/or said bearings-related clamping means are further configured to exert said axial force as a preloading force for axially preloading said bearings, wherein said preloading force is determined based at least partly on a minimal force required in order to prevent a ball belonging to one of the bearings from sliding instead of rolling.

4. Device according to claim 1, wherein said bearings-related clamping means comprises suspension means for providing rigidity in radial direction and flexibility in axial direction for said axis, and wherein said suspension means is configured to suspend said axis via said first bearing associated with said optical end.

5. Device according to claim 4, wherein said suspension means is configured to exert said axial force only on an outer rim of said outer part of the first bearing; wherein said outer part comprises a bearing rotation axis and an outer diameter (D); and
    wherein said outer rim corresponds to portions of the outer part distanced for at least an outer rim diameter (E) from said bearing rotation axis, said outer rim diameter (E) being not smaller than 85% of said outer diameter (D), preferably not smaller than 90% of said outer diameter (D), more preferably not smaller than 95% of said outer diameter (D).

6. Device according to claim 4, wherein said suspension means comprises at least one leaf spring, preferably at least three leaf springs, more preferably three leaf springs.

7. Device according to claim 4, wherein said suspension means is essentially ring-shaped and comprises an outer contour and an inner contour, wherein said at least one leaf spring extends along a tangential direction with respect to said outer contour, and wherein at least 50% of said outer contour belongs to any of said at least one leaf spring.

8. Device according to claim 4, wherein said suspension means is essentially ring-shaped and comprises an outer contour and an inner contour, and wherein said suspension means comprises an essentially conical surface provided near said inner contour for radial fixation of said outer part of the first bearing.

9. Device according to claim 1, wherein said axis comprises an essentially conical surface configured for said radial fixation of said axis with respect to each of the inner parts of the bearings, said radial fixation based at least partly on radial fixation of said conical surface.

10. Device according to claim 1, wherein said first and said second axial rotation bearings are ball bearings comprising an inner race and an outer race, said inner race comprised in said inner part and said outer race comprised in said outer part.

11. Device according to claim 1, wherein said conductor comprises radially extending conductor parts defining a conductor angular reach, wherein the magnetic field generating means are a plurality of magnetic anchor pairs, preferably four magnetic anchor pairs, and wherein said radially extending conductor parts are positioned inside said magnetic field.

12. Device according to claim 1, wherein the angular reach defined by each magnetic anchor has a spatial overlap with the corresponding angular reach defined by the conductor, and whereby the excess of angular reach of the anchor corresponds to the angular reach for the orientation of the axis.

13. Device according to claim 1, wherein said axial clamping of said axis by means of at least said axis-related clamping means does not involve gluing; preferably wherein said axial clamping of said axis by means of said axis-related clamping means and said bearings-related clamping means does not involve gluing.

14. Device according to claim 1, wherein the axis-related clamping means relate to a conical axis surface provided on the axis near the electronic end of the axis, wherein a sliding fit between said conical surface and the inner part of the second bearing is realized to enable a friction-based radial fixation of the axis with respect to the inner part of the second bearing, wherein preferably the axis-related clamping means relate to a transverse surface provided on the axis near the optical end of the axis, and wherein preferably a transition fit between said transverse surface and the inner part of the first bearing is realized to enable a position-based radial fixation of the axis with respect to the inner part of the first bearing.

15. Device according to claim 1, wherein the bearings-related clamping means relate to a conical stator-related surface provided on a stator-related portion of the device configured for receiving the outer part of the second bearing, wherein a sliding fit between said conical stator-related surface and the outer part of the second bearing is realized to enable a friction-based radial fixation of the outer part of the second bearing with respect to the stator, wherein preferably the axis-related clamping means relate to a conical suspension-related surface, and wherein preferably a sliding fit between said conical suspension-related surface and the outer part of the first bearing is realized to enable a friction-based radial fixation of the outer part of the first bearing with respect to the stator.

16. System for deflecting a laser beam, comprising:
    the device for orientating an optical element around a rotational axis according to claim 1, said device comprising a rotor and a stator, said rotor comprising an axis comprising an optical end and an electronic end;
    an optical element, preferably a mirror, for said deflecting of said laser beam, said optical element mounted near said optical end of said axis.

17. Kit for deflecting a laser beam, comprising:
    the device for orientating an optical element around a rotational axis according to claim 1, said device comprising a rotor and a stator, said rotor comprising an axis comprising an optical end and an electronic end;
    an optical element, preferably a mirror, for said deflecting of said laser beam, said optical element adapted for being mounted near said optical end of said axis.

18. Spring-based suspension means for use in a device according to claim 1, wherein said spring-based suspension means comprises at least one leaf spring, preferably at least three leaf springs, more preferably three leaf springs;
    wherein said spring-based suspension means comprises an outer contour and an essentially circular inner contour suitable for receiving an outer part of a first bearing; said spring-based suspension means preferably being essentially ring-shaped;
    wherein said spring-based suspension means is adapted for flexibly exerting an axial force on a rotationally moveable axis of said device while radially fixating said axis, whereby said flexibly exerting of said axial force is performed by said at least one leaf spring on said outer part of said first bearing when said first bearing is mounted between said spring-based suspension means and said axis, and whereby said radially fixating of said axis is performed at least partly by radially fixating said outer part of said first bearing when said outer part is received by said inner contour and said first bearing is mounted between said spring-based suspension means and said axis
    wherein said at least one leaf spring preferably extends along a tangential direction with respect to said outer contour, and wherein at least 50% of said outer contour belongs to any of said at least one leaf spring;
    wherein preferably said suspension means comprises an essentially conical surface, more preferably at least three conical surface protrusions, most preferably three conical surface protrusions, provided near said inner contour for facilitating said receiving of said outer part for radial fixation of said outer part;

wherein preferably said spring-based suspension means is configured to exert said axial force only on an outer rim of said outer part of the first bearing; wherein preferably said outer part comprises a bearing rotation axis and an outer diameter (D); wherein preferably said outer rim corresponds to portions of the outer part distanced for at least an outer rim diameter (E) from said bearing rotation axis, said outer rim diameter (E) preferably being not smaller than 85% of said outer diameter (D), more preferably not smaller than 90% of said outer diameter (D); most preferably not smaller than 95% of said outer diameter (D).

\* \* \* \* \*